United States Patent
Kaminaga

(10) Patent No.: US 9,274,328 B2
(45) Date of Patent: Mar. 1, 2016

(54) IMAGE PROCESSING APPARATUS, MICROSCOPE SYSTEM, AND RECORDING MEDIUM

(71) Applicant: OLYMPUS CORPORATION, Shibuya-ku, Tokyo (JP)

(72) Inventor: Shigeto Kaminaga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 281 days.

(21) Appl. No.: 14/104,967

(22) Filed: Dec. 12, 2013

(65) Prior Publication Data
US 2014/0198197 A1     Jul. 17, 2014

(30) Foreign Application Priority Data

Jan. 11, 2013 (JP) ................. 2013-004006

(51) Int. Cl.
| | |
|---|---|
| H04N 7/18 | (2006.01) |
| G02B 21/36 | (2006.01) |
| G06T 5/00 | (2006.01) |
| G06T 5/40 | (2006.01) |
| G06T 5/50 | (2006.01) |

(52) U.S. Cl.
CPC .............. *G02B 21/367* (2013.01); *G06T 5/009* (2013.01); *G06T 5/40* (2013.01); *G06T 5/50* (2013.01); *G06T 2207/10016* (2013.01); *G06T 2207/10056* (2013.01); *G06T 2207/10152* (2013.01); *G06T 2207/20208* (2013.01); *G06T 2207/20221* (2013.01); *G06T 2207/30141* (2013.01)

(58) Field of Classification Search
CPC .............................. G02B 21/365; G02B 21/367
USPC ............................................ 348/79; 359/368
See application file for complete search history.

(56) References Cited

U.S. PATENT DOCUMENTS

| | | | | |
|---|---|---|---|---|
| 8,379,938 B2 * | 2/2013 | Kuniba | .................... | G06T 5/009 382/118 |
| 2001/0033683 A1 * | 10/2001 | Tanaka | .................... | G06T 7/001 382/149 |
| 2013/0308012 A1 | 11/2013 | Fukutomi | | |

FOREIGN PATENT DOCUMENTS

JP        2012-165259 A    8/2012

* cited by examiner

*Primary Examiner* — Thai Tran
*Assistant Examiner* — Mishawn Hunter
(74) *Attorney, Agent, or Firm* — Holtz, Holtz & Volek PC

(57) ABSTRACT

An image processing apparatus includes: a normalization unit that generates a plurality of normalized images by correcting, based on different imaging conditions, brightness of a plurality of images at different brightness obtained by imaging a same subject with the different imaging conditions; and an image combining unit that generates a combined image by combining the plurality of normalized images. When the normalized image corresponding to a reference image that is a brightest image among the plurality of images is defined as a reference normalized image, the image combining unit combines the reference normalized image and a non-reference normalized image that is the normalized image other than the reference normalized image to bring gradation of pixel of the combined image close to gradation of pixel of the reference normalized image if the gradation of pixel of the combined image is smaller than the gradation of pixel of the reference normalized image.

11 Claims, 17 Drawing Sheets

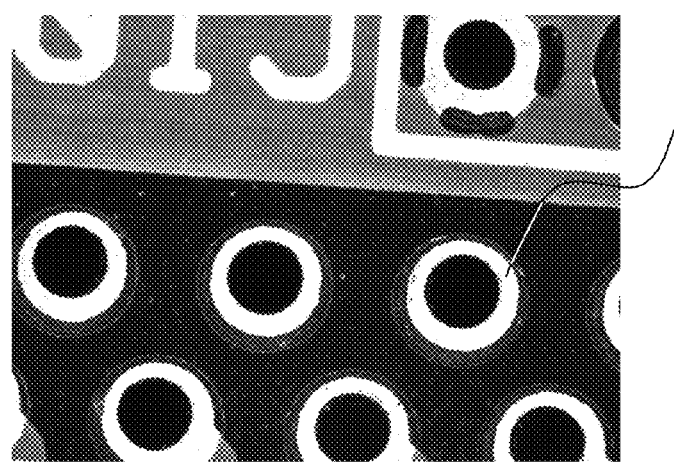
F I G. 1 A
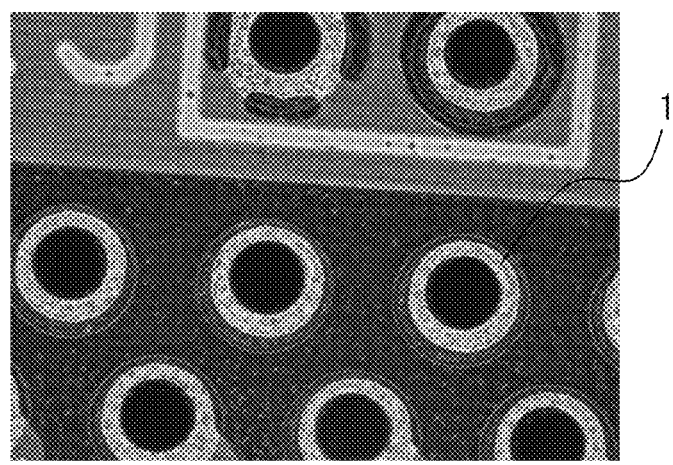
F I G. 1 B
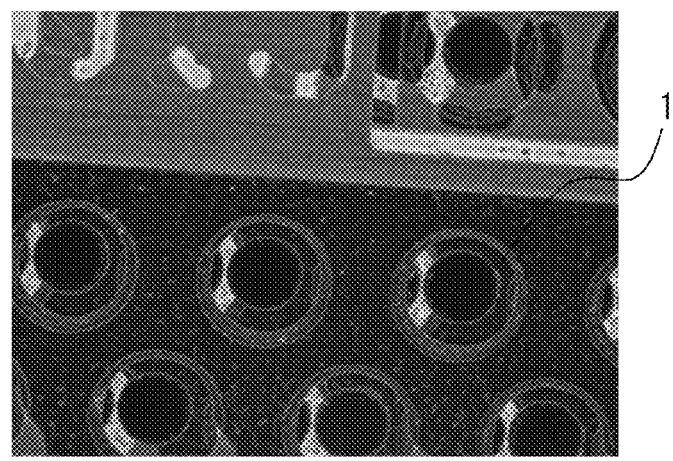
F I G. 1 C

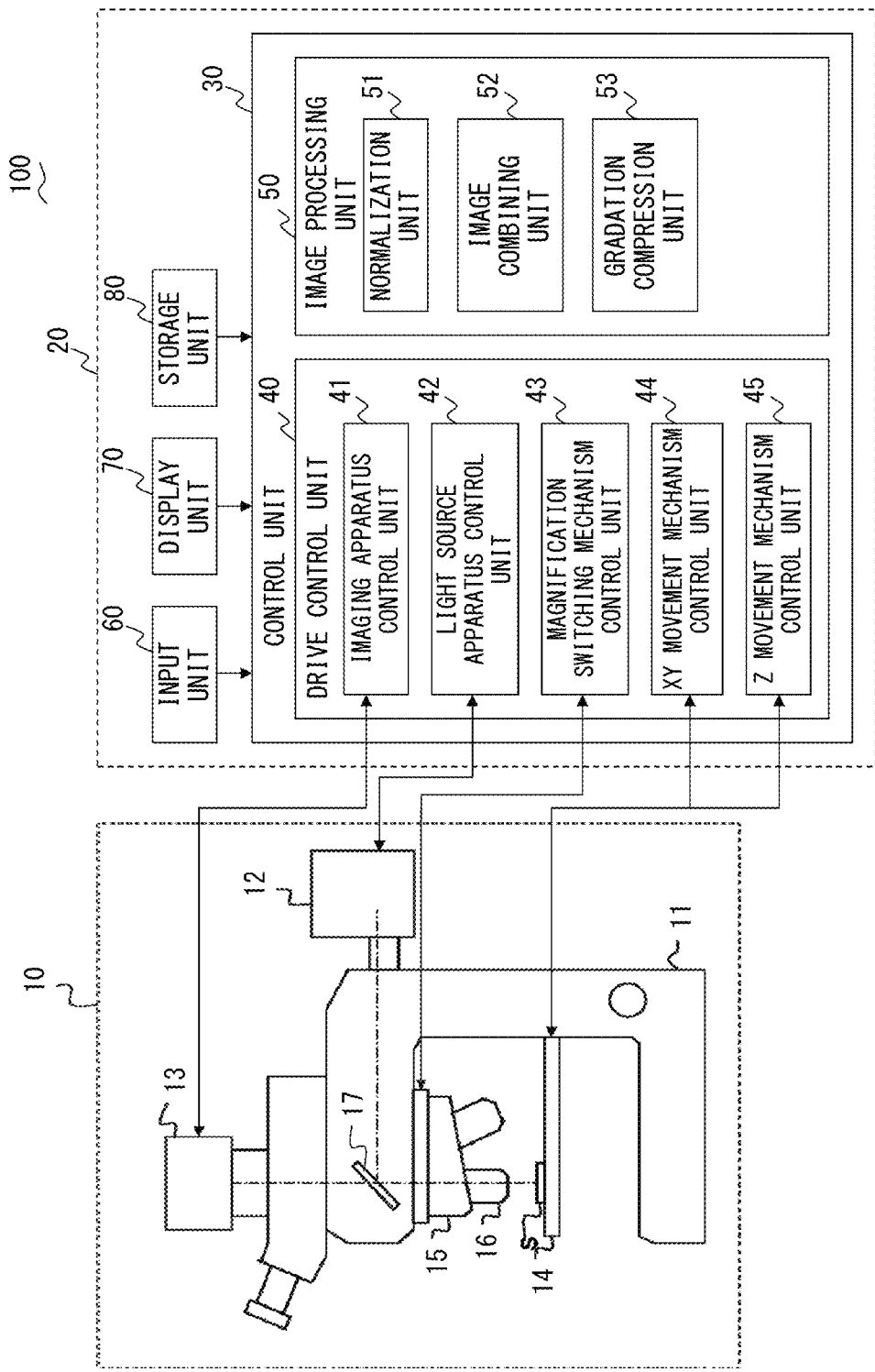
F I G. 4

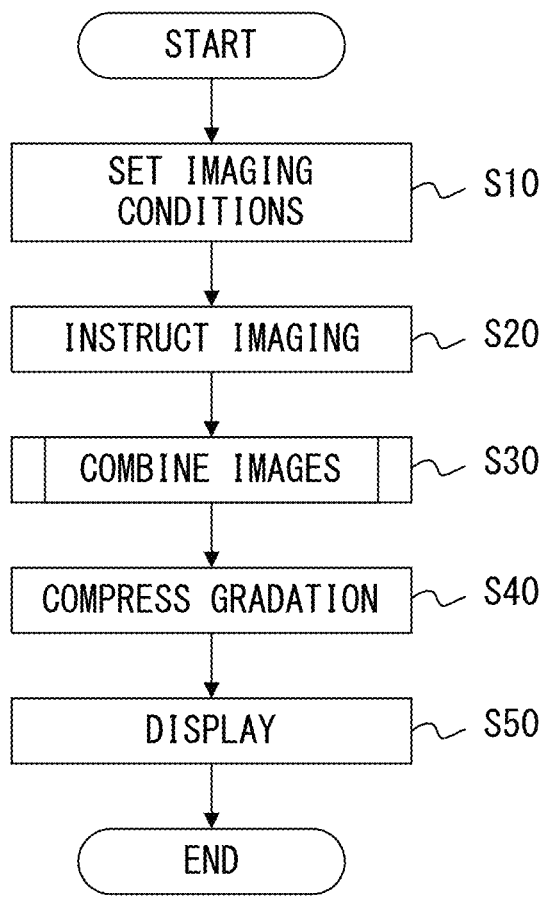
F I G. 5

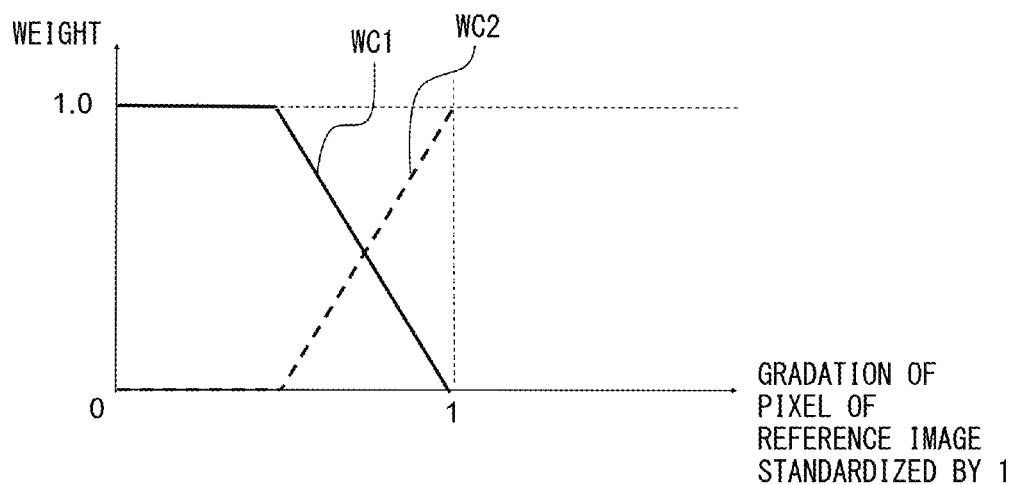
F I G. 7 A
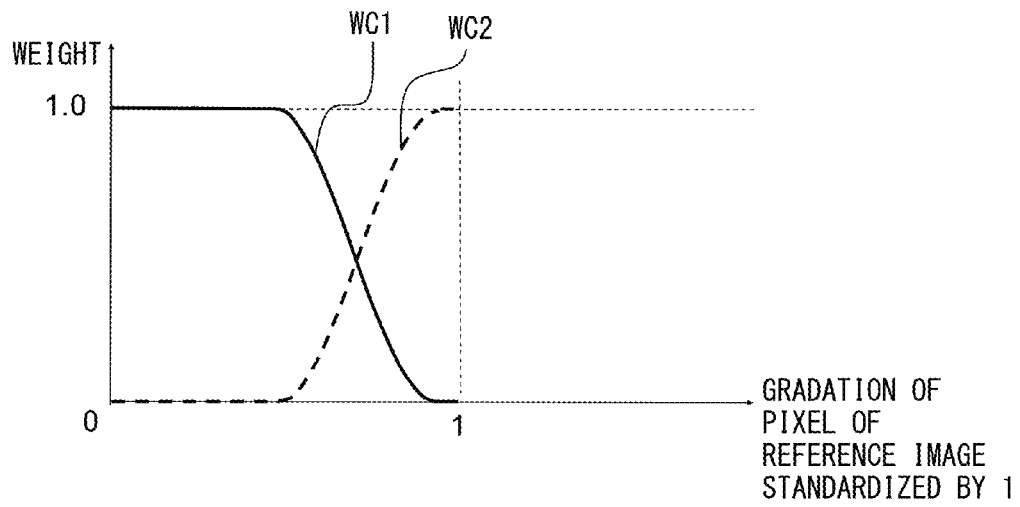
F I G. 7 B

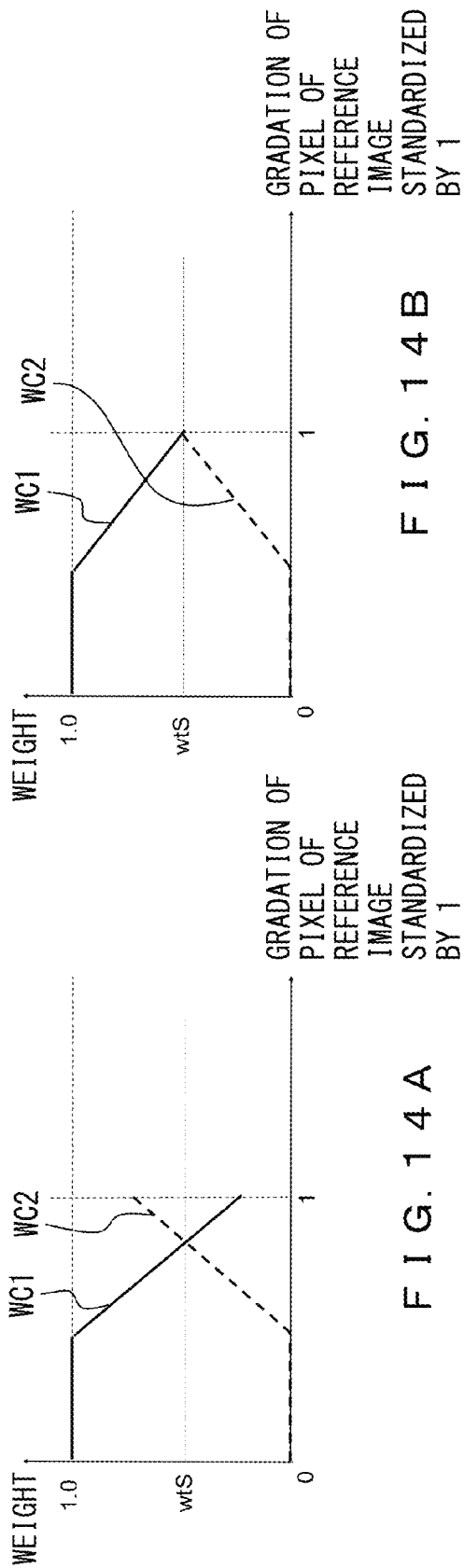

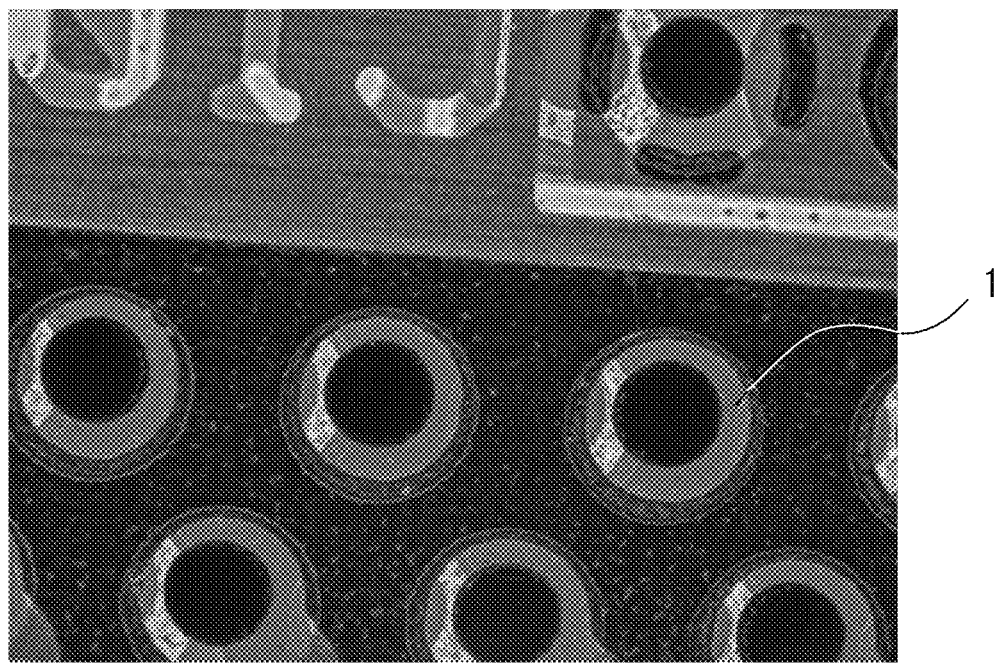
F I G. 1 5

IMAGE PROCESSING APPARATUS, MICROSCOPE SYSTEM, AND RECORDING MEDIUM

CROSS REFERENCE TO RELATED APPLICATIONS

This application is based upon and claims the benefit of priority from prior Japanese Patent Application No. 2013-004006, filed Jan. 11, 2013, the entire contents of which are incorporated herein by this reference.

BACKGROUND OF THE INVENTION

1. Field of the Invention

The present invention relates to an image processing apparatus, a microscope system, and a recording medium for combining a plurality of images to generate an image with a higher dynamic range.

2. Description of the Related Art

Conventionally, a high dynamic range process (hereinafter, "HDR process") is known in the field of an image processing apparatus provided with an imaging apparatus such as a microscope system, wherein a plurality of images (hereinafter, "original images") taken with different exposure conditions are combined to generate an image (hereinafter, "HDR image") with a higher dynamic range than that of the original images.

According to the HDR process, phenomena called blown out highlights and blocked up shadows can be prevented, and in principle, a subject can be favorably imaged in bright and dark sections to obtain a high-quality image. For example, if a soldered printed circuit board is imaged in a normal way, there are blown out highlights in a soldered section 1 as illustrated in FIG. 1A. Even in that case, the execution of the HDR process can obtain an image correctly expressing the gradation of the soldered section 1 as illustrated in FIG. 1B.

However, in the actual HDR process, a bright section of the subject may be imaged as a dark section, and a dark section may be imaged as a bright section. For example, FIG. 1C illustrates an example of imaging the soldered section 1, which is a bright section of the subject, as a dark section. Therefore, although the blown out highlights and the blocked up shadows are prevented, an image with reduced image quality is generated.

The reduction in the image quality needs to be particularly avoided in displaying moving images, although the reduction in the image quality is by no means preferable in displaying still images. The reason can be described as follows. As an area with reduced image quality moves with time in the movie display, not only the image quality is simply reduced, but the observer observes a blinking phenomenon in the movie display as illustrated in FIGS. 2A to 3E. Therefore, the reduction in the image quality gives much discomfort and burden to the observer. FIGS. 2A to 2E are diagrams illustrating HDR images generated at different timing, and FIGS. 3A to 3E are enlarged views of FIGS. 2A to 2E. FIGS. 2A to 3E illustrate movement of an area with reduced image quality (a soldered section imaged as a dark section).

Although there can be various factors for the reduction in the image quality of an HDR image, a displacement between original images to be combined can be a main factor. Typically, the displacement may occur when the original images are taken while the field of view is moved by stage operation or when the imaging apparatus is shaken. The displacement includes deviation of the angle of view between the original images.

Therefore, a technique of correcting the displacement to prevent the reduction in the image quality of the HDR image caused by the displacement is proposed. Japanese Patent Laid-Open No. 2012-165259 discloses a digital camera that calculates an amount of displacement between original images as a motion vector and that combines the original images after positioning the original images.

SUMMARY OF THE INVENTION

An aspect of the present invention provides an image processing apparatus including: a normalization unit that generates a plurality of normalized images by correcting, based on different imaging conditions, brightness of a plurality of images at different brightness obtained by imaging a same subject with the different imaging conditions; and an image combining unit that generates a combined image by combining the plurality of normalized images, wherein when the normalized image corresponding to a reference image that is a brightest image among the plurality of images is defined as a reference normalized image, the image combining unit combines the reference normalized image and a non-reference normalized image that is the normalized image other than the reference normalized image to bring gradation of pixel of the combined image close to gradation of pixel of the reference normalized image if the gradation of pixel of the combined image is smaller than the gradation of pixel of the reference normalized image.

Another aspect of the present invention provides a microscope system including the image processing apparatus of the aspect described above, wherein the combined image generated by the image combining unit is displayed.

Yet another aspect of the present invention provides a non-transitory recording medium recording a program causing a computer to execute: a process of generating a plurality of normalized images by correcting, based on different imaging conditions, brightness of a plurality of images at different brightness obtained by imaging a same subject with the different imaging conditions; and when the normalized image corresponding to a reference image that is a brightest image among the plurality of images is defined as a reference normalized image, a process of generating a combined image by combining the plurality of normalized images, wherein the reference normalized image and a non-reference normalized image that is the normalized image other than the reference normalized image is combined to bring gradation of pixel of the combined image close to gradation of pixel of the reference normalized image if the gradation of pixel of the combined image is smaller than the gradation of pixel of the reference normalized image.

BRIEF DESCRIPTION OF THE DRAWINGS

The present invention will be more apparent from the following detailed description when the accompanying drawings are referenced.

FIGS. 1A to 1C are diagrams illustrating images of a soldered printed circuit board, FIG. 1A illustrating a case in which an HDR process is not executed, FIG. 1B illustrating a case in which gradation is correctly expressed by executing the HDR process, FIG. 1C illustrating a case in which the gradation is not correctly expressed by executing the HDR process;

FIG. 4 is a diagram illustrating a configuration of a microscope system according to an embodiment of the present invention;

FIG. 5 is a flow chart of a process executed by a host system included in the microscope system illustrated in FIG. 4;

FIGS. 7A and 7B are diagrams illustrating weight characteristics calculated in a weight characteristics calculation process included in the image combining process illustrated in FIG. 6, FIG. 7A depicting an example of weight characteristics that change in straight lines, FIG. 7B depicting an example of weight characteristics that change in curved lines;

FIGS. 14A and 14B are diagrams illustrating weight characteristics calculated in a weighting correcting process included in the weighting combining process according to the second embodiment illustrated in FIG. 13, FIG. 14A depicting an example in which the size of a comparison coefficient is medium, FIG. 14B depicting an example in which the comparison coefficient is 0;

FIG. 15 is a diagram illustrating an HDR image of the printed circuit board generated in the weighting combining process according to the second embodiment illustrated in FIG. 13;

DESCRIPTION OF THE EMBODIMENTS

Figure 2E:
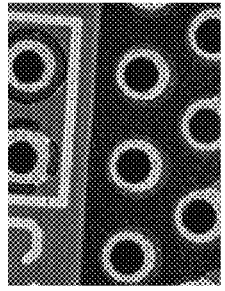
FIGS. 2A to 2E are diagrams illustrating HDR images generated at different timing, wherein a printed circuit board is the subject.
Figure 2D:
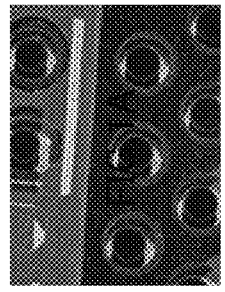
Figure 2C:
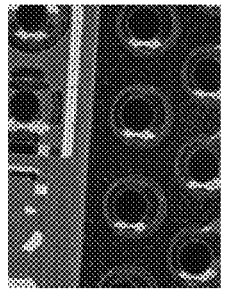
Figure 2B:
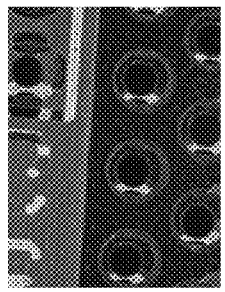
Figure 2A:
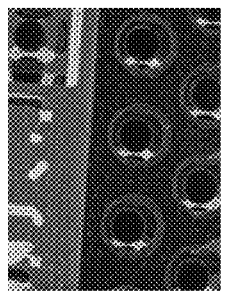
Figures 3A, 3B, 3C, 3D, 3E:
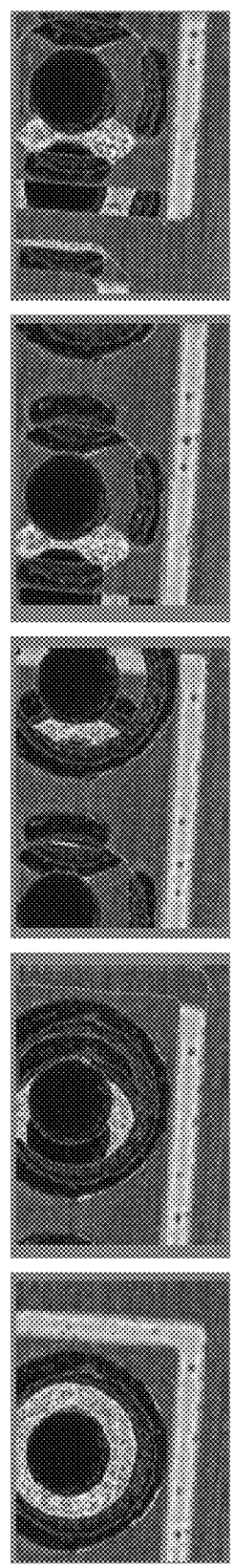
FIGS. 3A to 3E are enlarged views of FIGS. 2A to 2E.

The technique of combining the original images after correcting the displacement disclosed in Japanese Patent Laid-Open No. 2012-165259 is effective for preventing the reduction in the image quality caused by the displacement. On the other hand, a process of calculating the amount of displacement and a positioning process are necessary, and the technique has the following problems.

First, it takes time to generate HDR images. Therefore, displaying images of the subject in real time is difficult. The frame rate in the movie display may also be limited.

Second, the scale of circuits and software used in the HDR process is increased. Therefore, high-spec hardware, such as a high-speed CPU and a high-capacity memory, is necessary.

Third, if the calculation process of the amount of displacement or the positioning process fails, that is, if the processes are not accurate, the image quality is not guaranteed. Therefore, images with significantly reduced image quality may be generated.

In this way, the technique of combining the original images after correcting the displacement is an effective technique for improving the image quality, but the technique has various problems. Therefore, a technique that can prevent the reduction in the image quality caused by the displacement without correcting the displacement is demanded.

FIG. 4 is a diagram illustrating a configuration of a microscope system 100 according to an embodiment of the present invention. With reference to FIG. 4, the configuration of the microscope system 100 will be described with an example in which a sample S is a printed circuit board. However, the subject is not limited to the printed circuit board, and for example, the subject may be a biological sample. More specifically, the microscope system 100 illustrated in FIG. 4 is not limited to an industrial microscope system, and the microscope system 100 may be a biological microscope system.

As illustrated in FIG. 4, the microscope system 100 includes: a microscope apparatus 10 including an imaging apparatus 13 that images the sample S as the subject; and a host system 20 connected to the microscope apparatus 10. The microscope apparatus 10 includes a microscope body 11, and the imaging apparatus 13 is attached to the microscope body 11. In addition to the imaging apparatus 13, a light source apparatus 12 is also attached to the microscope body 11.

The microscope body 11 supports a stage 14 for arranging the sample S and a revolver 15 provided with an objective lens 16. A half mirror 17 is arranged inside of the microscope body 11, and the half mirror 17 functions as a light path branching element that branches an illumination light path for illumination light from the light source apparatus 12 and an observation light path for observation light from the sample S. The light path branching element is not limited to the half mirror 17. An arbitrary light path branching element may be arranged inside of the microscope body 11. For example, in fluorescent observation, a dichroic mirror may be arranged in place of the half mirror 17.

The stage 14 includes a horizontal installation surface orthogonal to the optical axis of the objective lens 16, and the stage 14 can freely move in XY directions orthogonal to the optical axis of the objective lens 16 and in a Z direction parallel to the optical axis of the objective lens 16. Although the stage 14 is an electric stage that is electrically moved in the XY directions and the Z direction by the drive of a motor not shown under the control of the host system 20, the stage 14 may be manually moved in the XY directions and the Z direction by operation of a knob not shown. The stage 14 may be electrically moved in one of the XY directions and the Z direction and may be manually moved in the other.

The microscope body 11 holds the revolver 15, and the revolver 15 can be freely rotated. As the revolver 15 is rotated, an objective lens (objective lens 16 here) selected from the objective lenses mounted on the revolver 15 is arranged over the sample S, or more specifically, on the observation light path.

The objective lens 16 is mounted on the revolver 15 along with the other objective lenses, and the objective lens 16 can be freely exchanged. The revolver 15 is rotated to alternatively switch and use the objective lenses according to the observation magnification or the observation method. The observation magnification of the microscope system 100 may be changed by, for example, changing the magnification of a zoom optical system arranged on the observation light path, instead of switching the objective lenses. The switch of the objective lenses and the change in the magnification of the zoom optical system may be combined to change the observation magnification.

The light source apparatus 12 is a light source apparatus for epi-illumination including a light source, such as a halogen lamp and an LED, and including collector lenses. The light source apparatus 12 is attached behind the microscope body 11, for example. The light source apparatus 12 may further include an ND (Neutral Density) filter for adjusting the amount of light from a lamp light source such as a halogen lamp. The adjustment of the amount of illumination light is not limited to the adjustment by the ND filter. For example, the amount of illumination light may be adjusted by changing the diameter of an aperture diaphragm arranged on the illumination light path. If the light source is an LED light source, the amount of illumination light may be adjusted by light emission control of the light source, such as PWM (Pulse Width Modulation) control. The light source apparatus 12 may be a fiber light source connected to the microscope body 11 through optical fibers or may be a laser light source apparatus including a laser. The microscope apparatus 10 may further include a light source apparatus for transmission illumination, in addition to or in place of the light source apparatus 12 for epi-illumination.

The imaging apparatus 13 is, for example, a digital camera and includes an imaging element such as a CCD (Charge Coupled Device) and a CMOS (Complementary Metal Oxide Semiconductor). The imaging apparatus 13 converts observation light, which forms a sample image on the light receiving surface, to an electrical signal (analog signal) and amplifies the electrical signal. The imaging apparatus 13 converts the electrical signal to a digital signal to acquire image data of the sample S and outputs the image data to the host system 20. The output image data is stored in a storage unit 80 of the host system 20. Hereinafter, the image data acquired by the imaging apparatus 13 will be described as "original image data", and the image of the sample S expressed by the original image data will be described as an "original image".

Although FIG. 4 illustrates the microscope apparatus 10 as an upright microscope that handles the printed circuit board as the subject to perform bright field observation, the microscope apparatus 10 may be an inverted microscope. The observation method is not limited to the bright field observation, and the subject may be observed by an arbitrary observation method (for example, dark field observation, fluorescent observation, polarization observation, and differential interference contrast observation). In that case, the filter and the optical system are appropriately exchanged according to the observation method.

The host system 20 includes: a control unit 30 that controls the entire microscope system 100; an input unit 60; a display unit 70; and the storage unit 80. The host system 20 may be, for example, a general-purpose computer, such as a work station and a personal computer, or may be a dedicated apparatus.

The control unit 30 includes: a drive control unit 40 that controls the drive of the microscope apparatus 10; and an image processing unit 50 that generates an HDR image. The control unit 30 is, for example, a CPU (Central Processing Unit). The CPU executes a control program to cause the host system 20 to function as a drive control apparatus that controls the drive of the microscope apparatus 10 and to function as an image processing apparatus that generates an HDR image by combining a plurality of original images acquired by the microscope apparatus 10.

The drive control unit 40 includes an imaging apparatus control unit 41, a light source apparatus control unit 42, a magnification switching mechanism control unit 43, an XY movement mechanism control unit 44, and a Z movement mechanism control unit 45. These control units control different parts of the microscope system 100.

The imaging apparatus control unit 41 controls the imaging operation of the imaging apparatus 13 by setting an analog gain for amplifying the analog signal output from the imaging element, switching ON/OFF of automatic exposure control, setting the exposure time, and so forth.

The light source apparatus control unit 42 controls the light source apparatus 12 to adjust the amount of illumination light emitted from the light source apparatus 12 and directed to the sample S. The light source apparatus control unit 42 may control the diaphragm arranged on the illumination light path to change the diameter of the diaphragm to adjust the amount of illumination light. The light source apparatus control unit 42 may also control an ND filter switching apparatus to switch the ND filter on the illumination light path to adjust the amount of illumination light.

The magnification switching mechanism control unit 43 controls and rotates the revolver 15 to switch the objective lens used for the observation to change the observation magnification. The magnification switching mechanism control unit 43 may also control a zoom optical system not illustrated to change the magnification of the zoom optical system to change the observation magnification.

An origin sensor not illustrated detects a predetermined origin position of the stage 14 in the XY directions, and the XY movement mechanism control unit 44 controls the drive of the motor based on the origin position. In this way, the XY movement mechanism control unit 44 moves the stage 14 to an arbitrary XY position to adjust the observation position of the sample S. The XY position of the stage 14 is output to the XY movement mechanism control unit 44 as necessary.

An origin sensor not illustrated detects a predetermined origin position of the stage 14 in the Z direction, and the Z movement mechanism control unit 45 controls the drive of the motor based on the origin position. In this way, the Z movement mechanism control unit 45 moves the stage 14 to an arbitrary Z position to adjust the focal position of the objective lens 16 relative to the sample S. Instead of the stage 14, the Z movement mechanism control unit 45 may move the revolver 15 to the arbitrary Z position to adjust the focal position of the objective lens 16 relative to the sample S. The Z position of the stage 14 or the revolver 15 is output to the Z movement mechanism control unit 45 as necessary.

In the microscope system 100, the drive control unit 40 controls the drive of the microscope apparatus 10 to cause the microscope apparatus 10 to acquire a plurality of original images at different brightness by imaging the same subject (sample S) with different imaging conditions in order to generate an HDR image. More specifically, under the control by the drive control unit 40, the microscope apparatus 10 functions as an image acquisition unit that images the same subject (sample S) with different imaging conditions to acquire a plurality of original images at different brightness. The imaging conditions denote various conditions for changing the brightness of the image, such as setting of the exposure time, setting of the analog gain, setting of the diaphragm diameter, setting of the ND filter, and setting of the amount of light per unit time emitted from the light source.

The image processing unit 50 includes a normalization unit 51, an image combining unit 52, and a gradation compression unit 53, and these units cooperate to generate an HDR image from a plurality of original images of the sample S at different brightness.

The normalization unit 51 acquires the plurality of original images at different brightness acquired by the microscope apparatus 10 and acquires the imaging conditions of the original images. The normalization unit 51 corrects the original images based on the imaging conditions to generate a plurality of normalized images. For example, if there are two original images with a difference only in the exposure time, the normalization unit 51 corrects the original images based on the exposure time to acquire normalized images.

The image combining unit 52 executes an HDR process of combining the plurality of normalized images generated by the normalization unit 51 to generate an HDR image that is a combined image with a higher dynamic range than that of the original images. Details of the operation of the image combining unit 52 will be described later.

The gradation compression unit 53 compresses the gradation of the HDR image generated by the image combining unit 52 while maintaining the image quality and converts the HDR image to an HDR image that can be displayed by the display unit 70. The gradation compression unit 53 uses a known arbitrary compression algorithm.

The input unit 60 is means for receiving an instruction from the user, such as a keyboard, a mouse, and a touch panel, and the input unit 60 outputs, to the control unit 30, an operation signal according to the received instruction.

The display unit 70 is a display apparatus, such as a CRT (Cathode Ray Tube) display, an LCD (Liquid Crystal Display), and an organic EL (electroluminescence) display, and the display unit 70 displays the HDR image and the like on the screen based on the signal from the control unit 30. The input unit 60 and the display unit 70 may be integrated by arranging the touch panel over the screen of the display apparatus, for example.

The storage unit 80 includes a main storage device, such as a ROM (Read Only Memory) and a RAM (Random Access Memory), and an external storage device, such as a hard disk. The storage unit 80 may further include a portable recording medium drive apparatus and a portable recording medium, such as an optical disk and a flash memory, inserted to the portable recording medium drive apparatus. The storage unit 80 stores a control program of the microscope system 100, various data used in the execution of the control program including image data, etc. Among these, the control program is recorded in the ROM or the portable recording medium and is loaded on the RAM for the execution.

Although FIG. 4 illustrates an example in which the input unit 60, the display unit 70, and the storage unit 80 are arranged inside of the host system 20, the microscope system 100 may include these units as peripheral devices connected to the host system 20. A communication apparatus used to communicate with an external apparatus, a print apparatus, and the like may also be connected to the host system 20.

Figure 6:
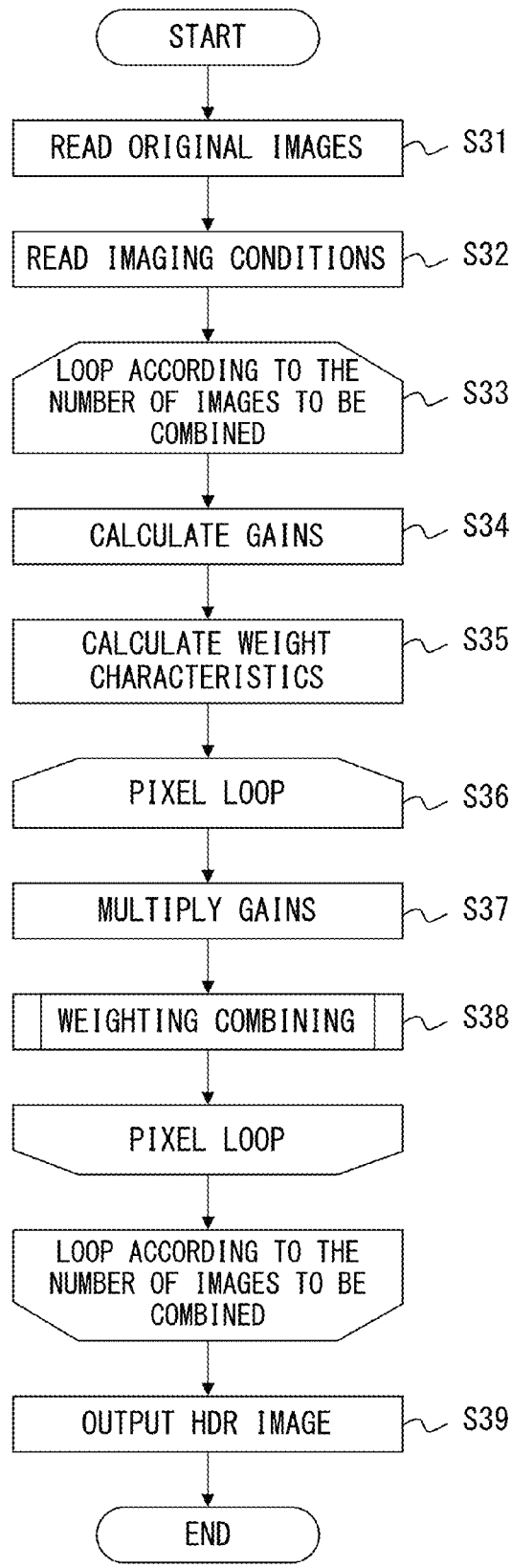
FIG. 6 is a flow chart of an image combining process included in the process illustrated in FIG. 5.

FIG. 5 is a flow chart of a process executed by the host system 20 included in the microscope system 100 according to an embodiment of the present invention. FIG. 6 is a flow chart of an image combining process included in the process illustrated in FIG. 5. A process of generating and displaying an HDR image by the host system 20 will be described with reference to FIGS. 5 and 6. The control program recorded in the ROM of the storage unit 80 or the portable recording medium is loaded on the RAM, and the control unit 30 executes the control program to execute the processes illustrated in FIGS. 5 and 6. The process is started by, for example, an instruction of the user from the input unit 60.

The drive control unit 40 sets imaging conditions according to an instruction of the user input to the input unit 60 (step S10 of FIG. 5). A plurality of imaging conditions are set to acquire a plurality of original images at different brightness. Subsequently, the drive control unit 40 (imaging apparatus control unit 41) instructs the microscope apparatus 10 to take images and causes the microscope apparatus 10 to acquire original images with the plurality of imaging conditions set in step S10 (step S20 of FIG. 5). As a result, the plurality of original images at different brightness acquired by the microscope apparatus 10 and obtained by imaging the sample S with different imaging conditions are transmitted to the host system 20 and stored in the storage unit 80. In this case, the imaging conditions of the original images are also stored in the storage unit 80.

The image processing unit 50 combines the plurality of original images to generate an HDR image with a higher dynamic range than that of the original images (step S30 of FIG. 5).

More specifically, the image processing unit 50 reads the plurality of original images and the imaging conditions of the plurality of original images from the storage unit 80 as illustrated in FIG. 6 (steps S31 and S32 of FIG. 6). At the same time as the reading of the plurality of original images, the image processing unit 50 arranges the plurality of original images in the order of brightness and defines the brightest image as a reference image. The image processing unit 50 starts a loop process (hereinafter, "first loop process") for the number of times corresponding to the number of original images (hereinafter, "non-reference images") to be combined with the reference image (step S33 of FIG. 6) and combines the non-reference images with the reference image one-by-one in order from the brightest image.

In the first loop process, the image processing unit 50 (normalization unit 51) first executes a gain calculation process (step S34 of FIG. 6). The gain calculation process is a process of calculating gains for adjusting the differences between the imaging conditions of the reference image and the non-reference images, and the gain is calculated for each image. If the difference between the imaging conditions of the reference image and the non-reference image is only in the exposure time, a gain G1 for adjusting the reference image is defined as an arbitrary constant a, and a gain G2 for adjusting the non-reference image is calculated by constant a×exposure time T1 of reference image/exposure time T2 of non-reference image. Therefore, if the exposure time of the non-reference images is ½, ¼, ⅛, . . . of the exposure time of the reference image, the gains of the non-reference images are 2a, 4a, 8a, . . . .

The image processing unit 50 (image combining unit 52) executes a weight characteristics calculation process (step S35 of FIG. 6). The weight characteristics calculation process is a process of calculating weight characteristics for determining weights of the reference image and the non-reference images in combining the images, that is, combining ratios of the reference image and the non-reference images. Weight characteristics WC2 of a non-reference image depend on weight characteristics WC1 of the reference image. An arbitrary method used in an existing HDR process can be adopted as a calculation method, and the details will not be described.

FIGS. 7A and 7B are diagrams illustrating the weight characteristics calculated in step S35. The horizontal axis denotes gradation of pixel of the reference image (or reference normalized image described later) standardized by 1, and the vertical axis denotes weight. The weight characteristics WC1 indicated by a solid line denote weight characteristics of the reference image. On the other hand, the weight characteristics WC2 indicated by a broken line denote weight characteristics of the non-reference image, and the weight characteristics WC2 are uniquely determined from the weight characteristics WC1 of the reference image. Specifically, the weight characteristics WC2 is calculated as a difference between 1 and the weight characteristics WC1 of the reference image. To allow appropriate correction of the gradation of saturated pixels of the reference image by the gradation of pixel of the non-reference image, the weight characteristics WC1 of the reference image can be characteristics that reduce the weight of the reference image with an increase in the gradation of the reference image. Therefore, for example, the weight characteristics WC1 of the reference image may change in a straight line from predetermined gradation of the reference image to the maximum gradation (1 here) as illustrated in FIG. 7A or may change in a curved line as illustrated in FIG. 7B.

When the gains and the weight characteristics are calculated, the image processing unit 50 starts a loop process (hereinafter, "second loop process") for the number of times corresponding to the number of pixels of the reference image (step S36 of FIG. 6) and combines the pixels of the non-reference image with the pixels of the reference image.

In the second loop process, the image processing unit 50 (normalization unit 51) first executes a gain multiplication process (step S37 of FIG. 6). More specifically, the image processing unit 50 multiplies the pixel of the reference image by the gain G1 calculated in step S34 and multiplies the pixel of the non-reference image by the gain G2 calculated in step S34 to correct the gradation of the pixels. This process is applied to all pixels to correct, based on the imaging conditions, the brightness of the reference image and the non-reference image acquired with different imaging conditions, and images (hereinafter, "normalized images") with the same conditions regarding the brightness are generated. Hereinafter, a normalized image corresponding to the reference image among the normalized images that are images in which the brightness of the image, i.e. gradation of all pixels, is corrected in the process of step S37 will be particularly described as a "reference normalized image". The normalized images other than the reference normalized image will be described as "non-reference normalized images".

When the gain multiplication process is finished, the image processing unit 50 (image combining unit 52) executes a weighting combining process (step S38 of FIG. 6). The weighting combining process of the host system 20 is clearly different from the weighting combining process executed in the conventional HDR process. To facilitate understanding of the difference from the conventional process, the conventional weighting combining process will be described first, and then the weighting combining process of the host system 20 will be described. Specific examples of the weighting combining process of the host system 20 will be described in detail in the embodiments.

Figure 8:
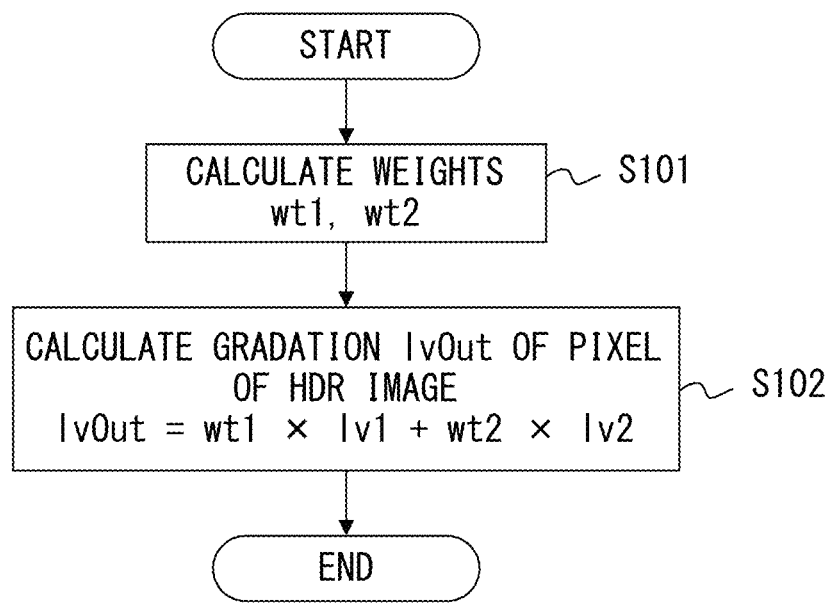
FIG. 8 is a flow chart of a conventional weighting combining process.

FIG. 8 is a flow chart of the conventional weighting combining process. In the conventional weighting combining process, the weight of pixel of the reference normalized image and the weight of pixel of the non-reference normalized image are calculated based on the weight characteristics calculated in step S35 and based on the gradation of pixel of the reference normalized image calculated in step S37 (step S101 of FIG. 8).

Subsequently, the weights calculated in step S101 are used to calculate gradation lvOut of pixel of an HDR image (step S102 of FIG. 8). The formula is expressed as follows using gradation lv1 of pixel of the reference normalized image, gradation lv2 of pixel of the non-reference normalized image, a weight wt1 of pixel of the reference normalized image, and a weight wt2 of pixel of the non-reference normalized image.

$$lvOut = wt1 \times lv1 + wt2 \times lv2 \quad (1)$$

As is clear from Expression (1), the component (wt2×lv2 here) of the non-reference normalized image affects the gradation of pixel of the HDR image if wt2 is greater than 0, that is, if the gradation of pixel of the reference normalized image is high according to FIGS. 7A and 7B. This includes a case in which the gradation is so high as to be saturated. Therefore, the gradation lv2 of pixel of the non-reference normalized image is usually greater than or about the same as the gradation lv1 of pixel of the reference normalized image. Thus, the gradation lvOut of pixel of the HDR image is also greater than or about the same as the gradation lv1 of pixel of the reference normalized image.

However, even if the gradation of pixel of the reference normalized image is so high as to be saturated, a dark pixel of the non-reference normalized image may overlap with a bright pixel of the reference normalized image, and the gradation lv2 may be smaller than the gradation lv1, if the positions of the reference normalized image and the non-reference normalized image are displaced. As a result, the gradation lvOut may also be calculated to be smaller than the gradation lv1. Therefore, although the blown out highlights and the blocked up shadows are prevented, HDR images with reduced image quality are generated, and a blinking phenomenon occurs in the movie display of the HDR images.

On the other hand, the weighting combining process of the host system 20 is designed to combine the reference normalized image and the non-reference normalized image to bring the gradation lvOut of pixel of the HDR image close to the gradation lv1 of pixel of the reference normalized image when the gradation lvOut of pixel of the HDR image calculated based on a combining ratio (ratio of the weights wt1 and wt2) determined by the gradation lv1 of pixel of the reference normalized image is smaller than the gradation lv1 of pixel of the reference normalized image.

In this way, generation of an HDR image expressing the blown out highlights of the reference image (or reference normalized image) by significantly low gradation can be prevented in the host system 20. Therefore, the reduction in the image quality of the HDR images caused by the displacement can be prevented, and furthermore, the occurrence of the blinking phenomenon in the movie display of the HDR images can be prevented.

On the other hand, if there is no displacement, HDR images equivalent to those in the conventional weighting combining process can be output.

When the weighting combining process of step S38 of FIG. 6 is finished, the image processing unit 50 returns to step S36 to repeat the processes of steps S37 and S38 for all pixels. When the process for all pixels is finished and an HDR image is generated by combining the reference image as the brightest original image and the second brightest original image, the image processing unit 50 returns to step S33 to define the generated HDR image as the reference image again and combines the reference image and the third brightest original image to generate an HDR image as a second combined image (steps S33 to S38). When all original images are combined and the loop process of step S33 is finished, the image processing unit 50 outputs the ultimately obtained HDR image to the gradation compression unit 53 (step S39 of FIG. 6) and ends the image combining process of FIG. 5 (step S30 of FIG. 5).

Subsequently, if the number of the gradation having the HDR image and the number of the gradation calculated from the effective number of bits of the output format do not match, the gradation compression unit 53 applies a gradation compression process to the HDR image (step S40 of FIG. 5). The image processing unit 50 outputs, to the display unit 70, the HDR image that is generated in the gradation compression process and that can be displayed by the display unit 70 and causes the display unit 70 to display the HDR image (step S50 of FIG. 5). The HDR image is stored in the storage unit 80 as necessary.

As described, the host system 20 and the microscope system 100 including the host system 20 can generate HDR images in which the reduction in the image quality caused by the displacement is prevented, without correcting the displacement. Therefore, the HDR images can be generated faster than in the microscope system that generates the conventional HDR images, and HDR images closer to real-time images can be displayed.

The host system 20 and the microscope system 100 can generate HDR images in which the reduction in the image quality caused by the displacement is reduced, just by changing the program of an existing microscope system. The scale of the software hardly changes, and the HDR process can be executed by hardware with conventional specifications.

When an advanced computation process, such as a calculation process of the amount of displacement and a positioning process, is used, the HDR process may fail if, for example, an image with few image features or an image in which similar patterns periodically appear is input. However, the host system 20 and the microscope system 100 do not require an advanced computation process, such as a calculation process of the amount of displacement and a positioning process. Therefore, the possibility that the HDR process fails is significantly low, and the possibility of generating HDR images with significantly lower image quality than in the conventional microscope system can be reduced to a low level. The host system 20 and the microscope system 100 may switch and execute the conventional HDR process of executing the combining process after correcting the displacement and the above-described HDR process of executing the combining process without correcting the displacement. For example, the HDR process may be executed when the correction of the displacement has failed in the conventional HDR process.

Hereinafter, specific examples of the weighting combining process of the host system 20 will be described in detail in first and second embodiments.

First Embodiment

Figure 9:
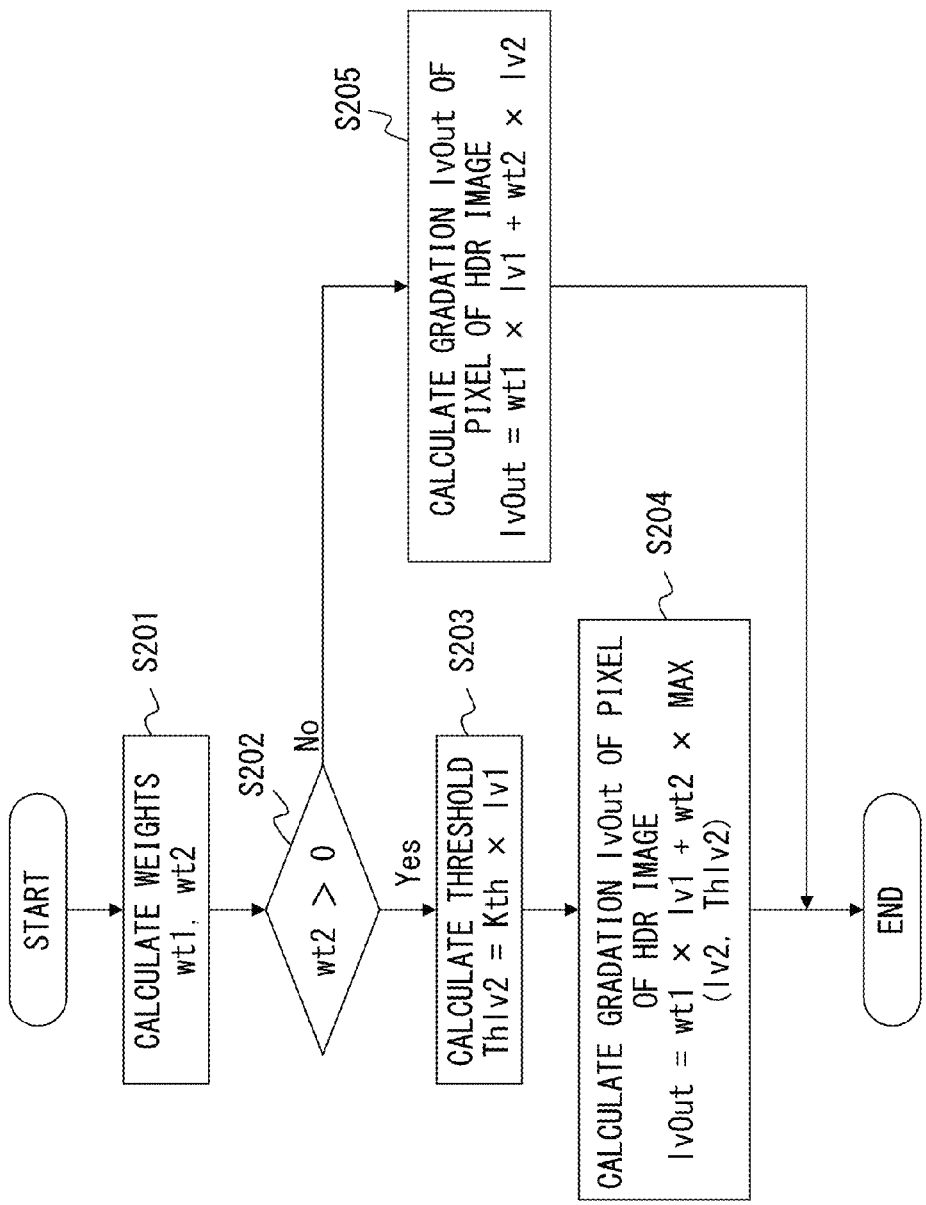
FIG. 9 is a flow chart of a weighting combining process according to a first embodiment executed by the host system included in the microscope system illustrated in FIG. 4.

FIG. 9 is a flow chart of a weighting combining process according to the present embodiment executed by the host system 20 included in the microscope system 100 illustrated in FIG. 4. In the weighting combining process according to the present embodiment illustrated in FIG. 9, when the gradation lv2 of pixel of the non-reference normalized image is smaller than a threshold Thlv2 calculated based on the gradation lv1 of pixel of the reference normalized image, the image combining unit 52 calculates the gradation lvOut of pixel of the HDR image by multiplying the gradation lv1 and the threshold Thlv2 by the combining ratio (ratio of the weights wt1 and wt2) determined by the gradation lv1.

The imaging combining unit 52 calculates the weight wt1 of pixel of the reference normalized image and the weight wt2 of pixel of the non-reference normalized image based on the weight characteristics WC1 and WC2 calculated in step S35 of FIG. 6 and based on the gradation of pixel of the reference normalized image calculated in step S37 of FIG. 6 (step S201 of FIG. 9).

The image combining unit 52 determines whether the weight wt2 calculated in step S201 is greater than 0 (step S202 of FIG. 9). If the weight wt2 is equal to or smaller than 0, the image combining unit 52 calculates the gradation lvOut of pixel of the HDR image based on a formula (see Expression (1)) similar to the formula in the conventional weighting combining process (step S205 of FIG. 9) and ends the weighting combining process.

If the weight wt2 is greater than 0, the image combining unit 52 calculates the threshold Thlv2 (step S203 of FIG. 9). The formula of the threshold Thlv2 is expressed as follows using the gradation lv1 of pixel of the reference normalized image and a threshold coefficient Kth.

$$Thlv2 = Kth \times lv1 \quad (2)$$

The threshold coefficient Kth is a constant satisfying the following condition.

$$0 < Kth \leq 1 \quad (3)$$

Subsequently, the image combining unit 52 uses the weights calculated in step S201 and the threshold calculated in step S203 to calculate the gradation lvOut of pixel of the HDR image (step S204 of FIG. 9) and ends the weighting combining process. The formula is expressed as follows using the gradation lv1 of pixel of the reference normalized image, the gradation lv2 of pixel of the non-reference normalized image, the weight wt1 of pixel of the reference normalized image, the weight wt2 of pixel of the non-reference normalized image, and the threshold Thlv2.

$$lvOut = wt1 \times lv1 + wt2 \times MAX(lv2, Thlv2) \quad (4)$$

The MAX function is a function for returning the largest argument. Therefore, MAX (lv2, Thlv2) returns the larger one of the gradation lv2 and the threshold Thlv2. More specifically, Thlv2 is returned if lv2 is smaller than Thlv2.

The process of step S202 may be skipped. This is because if step S202 is NO, the value of the weight wt2 is 0, and there is no difference between the formula of step S204 and the formula of step S205.

Figure 10:
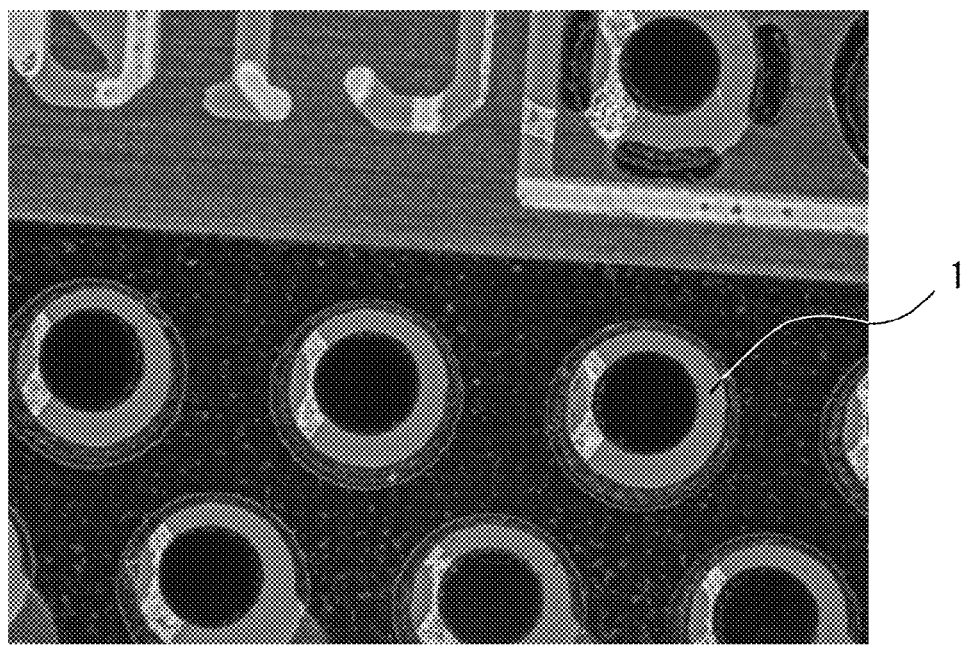
FIG. 10 is a diagram illustrating an HDR image of the printed circuit board generated in the weighting combining process according to the first embodiment illustrated in FIG. 9.
Figure 11A:
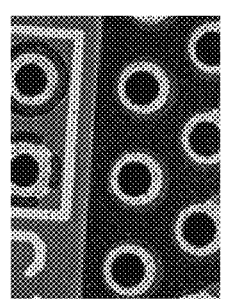
FIGS. 11A to 11E are diagrams illustrating HDR images of the printed circuit board generated at different timing in the weighting combining process according to the first embodiment illustrated in FIG. 9.
Figure 11B:
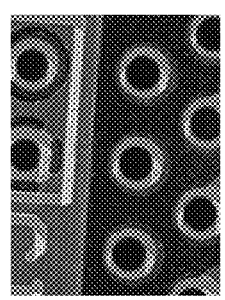
Figure 11C:
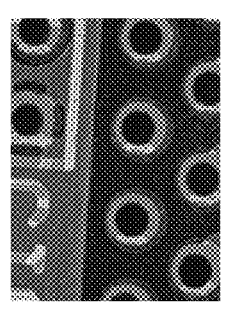
Figure 11D:
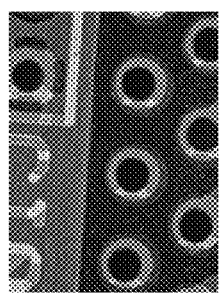
Figure 11E:
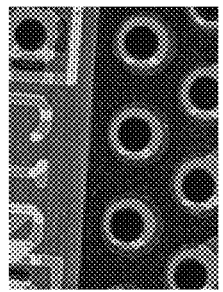
Figures 12A, 12B, 12C, 12D, 12E:
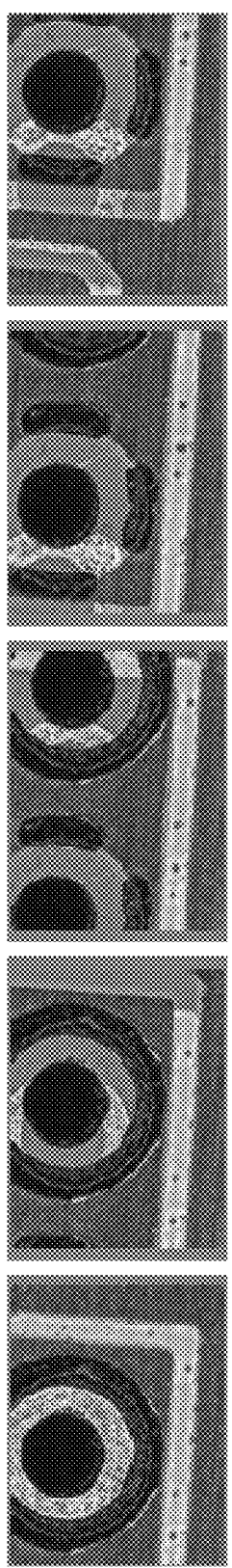
FIGS. 12A to 12E are enlarged views of FIGS. 11A to 11E.

FIG. 10 is a diagram illustrating an HDR image of the printed circuit board generated in the weighting combining process according to the present embodiment illustrated in FIG. 9. FIGS. 11A to 11E are diagrams illustrating HDR images of the printed circuit board generated at different timing in the weighting combining process according to the present embodiment illustrated in FIG. 9. FIGS. 12A to 12E are enlarged views of FIGS. 11A to 11E.

In the present embodiment, if the gradation lv2 of pixel of the non-reference normalized image is smaller than the threshold Thlv2 (=Kth×lv1), the component (wt2×MAX (lv2, Thlv2) here) equivalent to the component of the non-reference normalized image in the conventional weighting combining process is wt2×Kth×lv1. More specifically, a value equal to or greater than wt2×Kth×lv1 is guaranteed, regardless of the gradation lv2 of pixel of the non-reference normalized image. Therefore, even if the gradation lv2 indicates a value significantly smaller than the gradation lv1 due to the displacement between the reference image and the non-reference image, the threshold coefficient Kth is set according to the reduction in the image quality that can be tolerated by the user. This can prevent the gradation lvOut of pixel of the HDR image from becoming a significantly small value and can suppress the reduction in the image quality within the tolerance. Except for a specific reason described later, the gradation lv2 is always a value equal to or greater than the gradation lv1 if there is no displacement, and the gradation lv2 is always equal to or greater than the threshold Thlv2. Therefore, the output result is no different from the output result in the conventional weighting combining process if there is no displacement.

Therefore, even in a case in which the soldered section 1 that is a bright section is to be imaged as a dark section due to the displacement, the present embodiment can suppress the reduction in the luminance of the soldered section 1 as illustrated in FIG. 10, compared to the soldered section 1 of the conventional HDR image generated without correcting the displacement illustrated in FIG. 1C. Therefore, the reduction in the image quality caused by the displacement can be suppressed to generate HDR images without correcting the displacement. Samples to be observed in the microscope system are often prone to errors in the positioning by image analysis, such as a sample with a little luminance difference or edges and a sample including a large number of periodical patterns. Therefore, the HDR process according to the present embodiment without the need to correct the displacement is particularly suitable for a microscope system without means for detecting the position, wherein the position of the sample is changed by a manual stage.

Since the bright section is not displayed significantly dark, the luminance difference in the blinking phenomenon can be smaller as illustrated in FIGS. 11A to 12E, compared to the conventional blinking phenomenon illustrated in FIGS. 2A to 3E. This can reduce the discomfort or burden felt by the observer in the movie display.

The weighting combining process according to the present embodiment is a process equivalent to the conventional weighting combining process if there is no displacement. Therefore, the degradation of the HDR images with a displacement can be prevented without impairing the HDR images without a displacement.

As illustrated in FIG. 9, the weighting combining process according to the present embodiment is derived by adding a simple calculation process to the conventional weighting combining process, and an increase in the amount of calculation is significantly small compared to the case of combining the images after correcting the displacement. Therefore, the HDR images can be generated faster than when the displacement is corrected, and HDR images close to real-time images can be displayed. High-performance hardware is not necessary, and the conventional apparatus can be used as it is. The weighting combining process according to the present embodiment can be easily implemented in the microscope system.

Even if there is no displacement, the gradation lv2 may be smaller than the gradation lv1, i.e. lv1>lv2. This may be caused by an error between the exposure time set by the imaging apparatus control unit 41 and the actual exposure time of the imaging apparatus 13, an error caused by calculation accuracy of the control program, etc. Particularly, this can easily happen when the difference between the imaging conditions of the original images is large. If the gradation lv2 is substituted by the threshold Thlv2 when the gradation lv2 is slightly smaller than the gradation lv1 due to such an error, the gradation information included in the gradation lv2 is lost, and the information is not reflected on the MDR image. Therefore, it is desirable to set the threshold coefficient Kth to a value a little smaller than 1, such as 0.9 and 0.95, to prevent the substitution when the gradation lv2 is smaller than the gradation lv1 due to a slight error. More specifically, it is desirable to set the threshold Thlv2 a little smaller than the gradation lv1. This can prevent the reduction in the image quality caused by the displacement while avoiding a situation of losing the gradation information included in the gradation lv2 as much as possible. If the difference between the gradation lv1 and the gradation lv2 is small, the reduction in the image quality caused by the displacement is not large. In that case, it is desirable to set the threshold coefficient Kth to a value smaller than 1, for a reason that the HDR images look better when the gradation information of the gradation lv2 is reflected on the HDR images.

Although FIG. 6 illustrates an example of repeatedly combining two original images to combine all original images, a modification can be made to combine three or more original images at once. Methods of conventional techniques may be referenced to calculate appropriate weights from the imaging conditions or from the histogram distributions of the original images to combine the original images. In this case, a process of substituting the gradation lvOut by the threshold Thlv may be executed, in place of the process of substituting the gradation lv2 by the threshold Thlv2 illustrated in FIG. 9. In combining three images, the threshold Thlv may be calculated by Expressions (5) and (6), and the gradation lvOut may be substituted by the threshold Thlv as shown in Expression (8) if the gradation lvOut calculated by Expression (7) is smaller than the threshold Thlv, for example.

$$Thlv = Kth \times lv1 \tag{5}$$

$$0 < Kth < 1 \tag{6}$$

$$lvOut = wt1 \times lv1 + wt2 \times lv2 + wt3 \times lv3 \tag{7}$$

$$lvOut = \text{MAX}(lvOut, Thlv) \tag{8}$$

Second Embodiment

Figure 13:
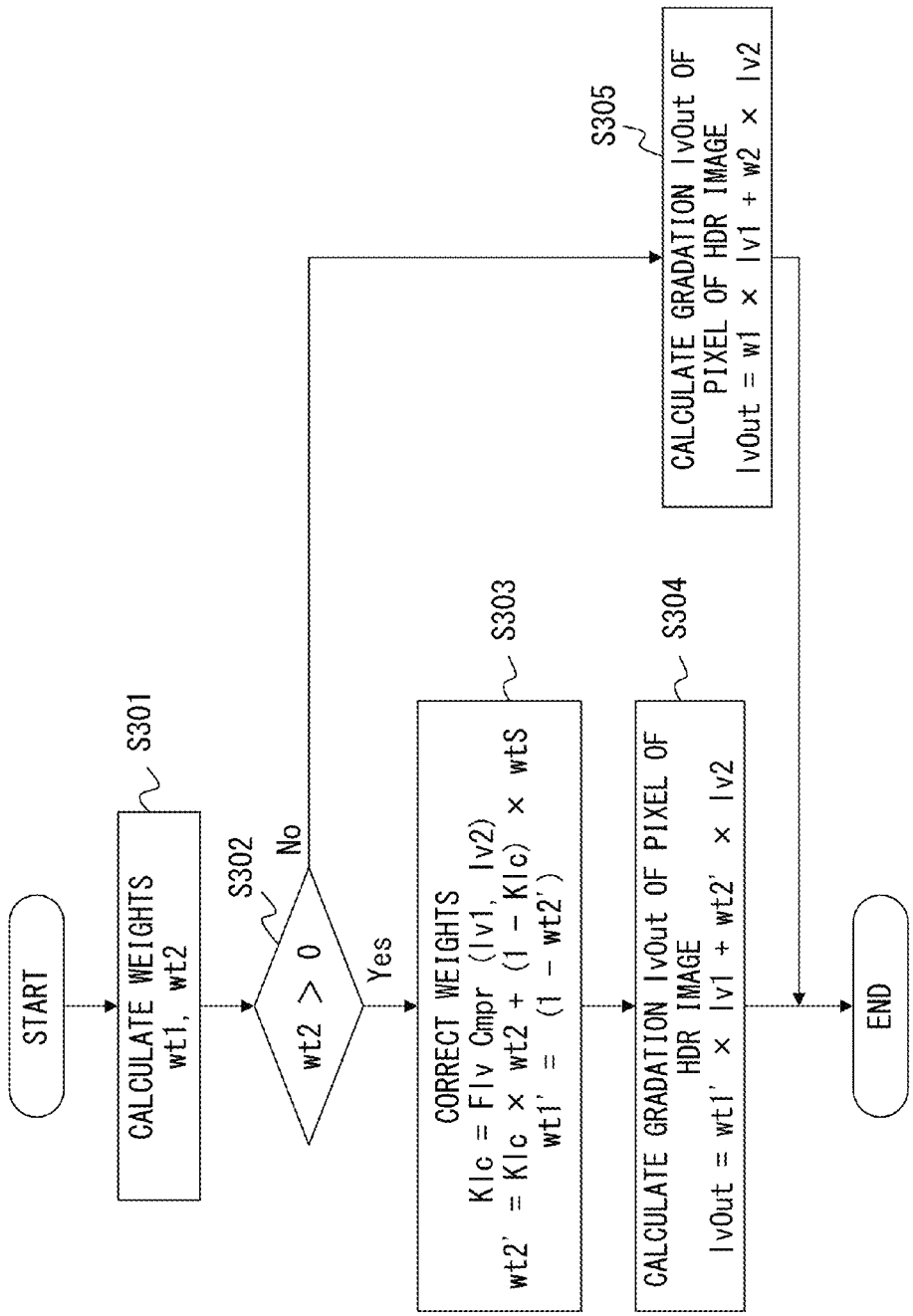
FIG. 13 is a flow chart of a weighting combining process according to a second embodiment executed by the host system included in the microscope system illustrated in FIG. 4.
Figure 16E:
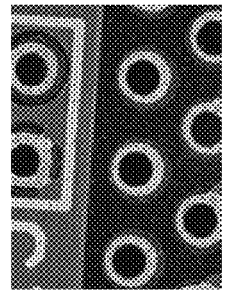
FIGS. 16A to 16E are diagrams illustrating HDR images of the printed circuit board generated at different timing in the weighting combining process according to the second embodiment illustrated in FIG. 13.
Figure 16D:
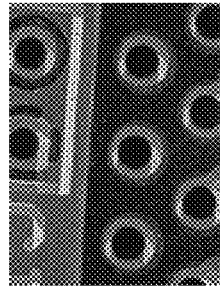
Figure 16C:
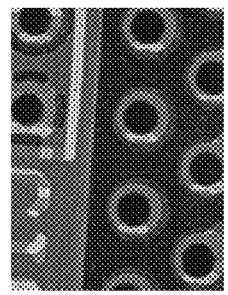
Figure 16B:
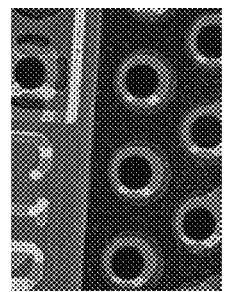
Figure 16A:
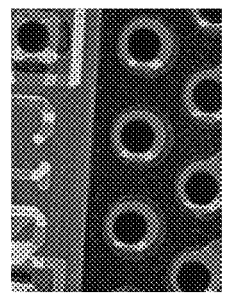
Figure 17E:
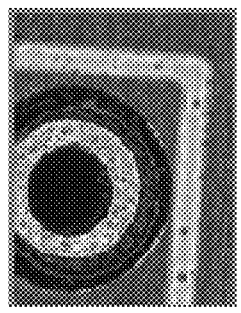
FIGS. 17A to 17E are enlarged views of FIGS. 16A to 16E.
Figure 17D:
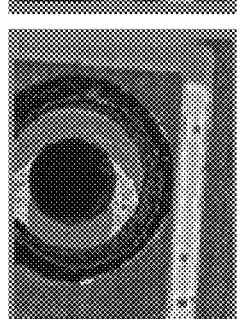
Figure 17C:
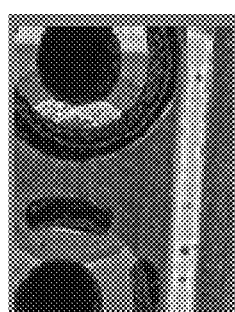
Figure 17B:
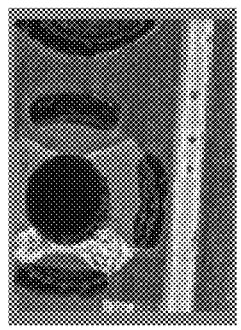
Figure 17A:

FIG. 13 is a flow chart of a weighting combining process according to the present embodiment executed by the host system 20 included in the microscope system 100 illustrated in FIG. 4. The threshold process is applied to the gradation of pixels (for example, gradation lv2 and gradation lvOut) in the weighting combining process of the first embodiment, whereas the weighting combining process according to the present embodiment is different in that the weight is adjusted. More specifically, as illustrated in FIG. 13, the weighting combining process according to the present embodiment is designed to combine the images by reducing the weight wt2 of the non-reference normalized image smaller than the weight determined by the initial combining ratio if the gradation lvOut of pixel of the HDR image calculated based on the combining ratio (ratio of the weights wt1 and wt2) determined by the gradation lv1 of pixel of the reference normalized image is smaller than the gradation lv1 of pixel of the reference normalized image.

The image combining unit 52 calculates the weight wt1 of pixel of the reference normalized image and the weight wt2 of pixel of the non-reference normalized image based on the weight characteristics WC1 and WC2 calculated in step S35 of FIG. 6 and the gradation of pixel of the reference normalized image calculated in step S37 of FIG. 6 to determine whether the calculated weight wt2 is greater than 0, and this is the same as in the weighting combining process according to the first embodiment (steps S301 and S302 of FIG. 13). The gradation lvOut of pixel of the HDR image is calculated by the same formula (see Expression (1)) as in the conventional weighting combining process if the weight wt2 is equal to or smaller than 0 (step S305 of FIG. 13), and the weighting combining process is finished. This is also the same as in the weighting combining process according to the first embodiment.

If the weight wt2 is greater than 0, the weight wt1 and the weight wt2 are corrected (step S303 of FIG. 13). A comparison coefficient Klc is calculated first. The formula of the comparison coefficient Klc is expressed as follows using the gradation lv1 of pixel of the reference normalized image and the gradation lv2 of pixel of the non-reference normalized image.

$$Klc = FlvCmpr(lv1, lv2) \quad (9)$$

The FlvCmpr function is expressed as follows using a Clip function for clipping a first argument by a second argument indicating the minimum value and by a third argument indicating the maximum value.

$$FlvCmpr(lv1, lv2) = Clip(lv2/lv1, 0, 1) \quad (10)$$

More specifically, the comparison coefficient Klc is a value equal to or greater than 0 and equal to or smaller than 1. The comparison coefficient Klc is 0 if lv2/lv1 is equal to or smaller than 0, 1 if lv2/lv1 is equal to or greater than 1, and lv2/lv1 in the other cases. Therefore, the gradation lv2 is usually equal to or greater than the gradation lv1 if there is no displacement, and the comparison coefficient Klc is 1. On the other hand, if the gradation lv2 is smaller than the gradation lv1 due to a displacement or the like (including a value calculation error), the comparison coefficient Klc is a value smaller than 1. The value of the comparison coefficient Klc decreases with a decrease in the size of the gradation lv2 relative to the gradation lv1. Other arbitrary formulas may be used to calculate the comparison coefficient Klc instead of the formulas shown in Expressions (9) and (10), as long as the value of the comparison coefficient Klc decreases with a decrease in the size of the gradation lv2 relative to the gradation lv1.

When the comparison coefficient Klc is calculated, a corrected weight wt1' is calculated by correcting the weight wt1, and a corrected weight wt2' is calculated by correcting the weight wt2. The formulas are expressed as follows using the comparison coefficient Klc, a suppression weight wtS, and the weight wt2 before the correction.

$$wt2' = Klc \times wt2 + (1 - Klc) \times wtS \quad (11)$$

$$wt1' = (1 - wt2') \quad (12)$$

The suppression weight wtS defines the maximum value of the weight characteristics WC2 and is a constant satisfying the following condition.

$$0 \leq wtS \leq 1 \quad (13)$$

In step S303, if there is no displacement or the like, that is, if the comparison coefficient Klc is 1, wt2' equals to wt2, and wt1' equals to wt1 based on Expressions (11) and (12). Therefore, the weights are not corrected. As a result, the weight characteristics WC1 and WC2 are the same as in the first embodiment, and for example, the characteristics are as illustrated in FIG. 7A.

On the other hand, if the comparison coefficient Klc is smaller than 1 due to a displacement or the like, the weights are corrected. For example, if the size of the comparison coefficient Klc is medium, the weight characteristics WC1 and WC2 indicate characteristics as illustrated in FIG. 14A. The maximum value of the weight characteristics WC2 that are characteristics of the corrected weight wt2' is a value between the suppression weight wtS and 1. If the comparison coefficient Klc is 0, the weight characteristics WC1 and WC2 indicate characteristics as illustrated in FIG. 14B. The maximum value of the weight characteristics WC2 equals to the suppression weight wtS.

Subsequently, the weights calculated in step S303 are used to calculate the gradation lvOut of pixel of the HDR image (step S304 of FIG. 13), and the weighting combining process is finished. The formula is expressed as follows using the gradation lv1 of pixel of the reference normalized image, the gradation lv2 of pixel of the non-reference normalized image, the corrected weight wt1' of pixel of the reference normalized image, and the corrected weight wt2' of pixel of the non-reference normalized image.

$$lvOut = wt1' \times lv1 + wt2' \times lv2 \quad (14)$$

The process of step S302 may be skipped to always execute the process of calculating the comparison coefficient Klc to correct the weights.

FIG. 15 is a diagram illustrating an HDR image of the printed circuit board generated in the weighting combining process according to the present embodiment illustrated in FIG. 13. FIGS. 16A to 16E are diagrams illustrating HDR images of the printed circuit board generated at different timing in the weighting combining process according to the present embodiment illustrated in FIG. 13. FIGS. 17A to 17E are enlarged views of FIGS. 16A to 16E.

In the present embodiment, the weights are not corrected if there is no displacement or the like, and Expression (14) is the same as the formula (see Expression (1)) of the conventional weighting combining process. Therefore, a combining result similar to that in the conventional process is obtained. On the other hand, if the gradation lv2 is smaller than the gradation lv1 due to a displacement or the like, the comparison coefficient Klc is reduced accordingly, and the weight wt2' is also reduced. This can prevent the gradation lvOut of pixel of the HDR image from becoming significantly small even if the gradation lv2 indicates a small value.

Therefore, even in a case in which the soldered section 1 that is a bright section is to be imaged as a dark section due to the displacement, the present embodiment can suppress the reduction in the luminance of the soldered section 1 as illustrated in FIG. 15, compared to the soldered section 1 of the conventional HDR image generated without correcting the displacement illustrated in FIG. 1C. Therefore, the reduction in the image quality caused by the displacement can be suppressed to generate HDR images without correcting the displacement, as in the first embodiment. The comparison coefficient Klc is continuously changed according to the size of the gradation lv2 relative to the gradation lv1. Therefore, unnatural change in the gradation can be prevented, and more natural HDR images than in the first embodiment with the threshold process can be generated.

Since the bright section is not displayed significantly dark, the luminance difference in the blinking phenomenon can be smaller as illustrated in FIGS. 16A to 17E, compared to the conventional blinking phenomenon illustrated in FIGS. 2A to 3E. This can reduce the discomfort or burden felt by the observer in the movie display, as in the first embodiment. The process is equivalent to the conventional weighting combining process if there is no displacement, as in the first embodiment. Therefore, the degradation of the HDR images with a displacement can be prevented without impairing the HDR images without a displacement.

The weight wt2' of the gradation lv2 decreases with a decrease in the gradation lv2. However, unlike the first embodiment in which the gradation lv2 is substituted by the threshold, the gradation information of the gradation lv2 is reflected on the gradation lvOut of pixel of the HDR image even if the gradation lv2 is small. Therefore, the change in the gradation of the soldered section 1 with the threshold process is small in the first embodiment as illustrated in FIG. 10. On the other hand, the change in the gradation of the soldered section 1 can be captured to visualize the structure of the soldered section 1 in the present embodiment as illustrated in FIG. 15. Since the gradation information of the gradation lv2 is reflected on the gradation lvOut, a threshold based on a calculation error or the like as in the first embodiment does not have to be set. Although it is preferable that the suppression weight wtS be small in order to prevent the reduction in the image quality, it is preferable that the suppression weight wtS be large on some level in order to reflect the gradation information of the gradation lv2 on the HDR image. Therefore, it is desirable that the suppression weight wtS be a medium value such as 0.5.

In the present embodiment, an increase in the amount of calculation is also small compared to when the displacement is corrected to combine the images. As a result, fast display of image is possible, high-performance hardware is not necessary, and implementation to the microscope system is easy, as in the first embodiment.

The embodiments illustrate specific examples to facilitate understanding of the invention, and the present invention is not limited to the embodiments. Various modifications and changes are possible for the microscope systems according to the embodiments without departing from the scope of the present invention defined by the claims, that is, to an extent that can prevent the gradation lvOut of pixel of the HDR image from becoming a value significantly smaller than the gradation lv2. For example, the process may be modified to sequentially combine the images from darker images, instead of sequentially combining the images from brighter images.

What is claimed is:

1. An image processing apparatus comprising:
    a normalization unit that generates a plurality of normalized images by correcting, based on different imaging conditions, brightness of a plurality of images at different brightness obtained by imaging a same subject with the different imaging conditions; and
    an image combining unit that generates a combined image by combining the plurality of normalized images, wherein
    when the normalized image corresponding to a reference image that is a brightest image among the plurality of images is defined as a reference normalized image, the image combining unit
    combines the reference normalized image and a non-reference normalized image that is the normalized image other than the reference normalized image to bring gradation of pixel of the combined image close to gradation of pixel of the reference normalized image if the gradation of pixel of the combined image is smaller than the gradation of pixel of the reference normalized image.

2. The image processing apparatus according to claim 1, wherein
    if gradation of pixel of the non-reference normalized image is smaller than a threshold calculated based on the gradation of pixel of the reference normalized image, the image combining unit calculates the gradation of pixel of the combined image by multiplying the gradation of pixel of the reference normalized image and the threshold by a combining ratio determined by the gradation of pixel of the reference normalized image.

3. The image processing apparatus according to claim 2, wherein
    the threshold is smaller than the gradation of pixel of the reference normalized image.

4. The image processing apparatus according to claim 1, wherein
    if the gradation of pixel of the combined image is smaller than a threshold calculated based on the gradation of pixel of the reference normalized image, the image combining unit substitutes the gradation of pixel of the combined image by the threshold.

5. The image processing apparatus according to claim 4, wherein
    the threshold is smaller than the gradation of pixel of the reference normalized image.

6. The image processing apparatus according to claim 1, wherein
    the image combining unit combines the reference normalized image and the non-reference normalized image by reducing the weight of the non-reference normalized image if the gradation of pixel of the combined image calculated based on a ratio of weights of the reference normalized image and the non-reference normalized image determined by the gradation of pixel of the reference normalized image is smaller than the gradation of pixel of the reference normalized image.

7. The image processing apparatus according to claim 6, wherein
    the image combining unit reduces the weight of the non-reference normalized image more the smaller the gradation of pixel of the non-reference normalized image is than the gradation of pixel of the reference normalized image.

8. The image processing apparatus according to claim 1, wherein
    the image combining unit handles the combined image as the reference normalized image to further generate a second combined image by combining the reference normalized image and a non-reference normalized image.

9. The image processing apparatus according to claim 1, further comprising
    an image acquisition unit that acquires the plurality of images at different brightness by imaging a same subject with different imaging conditions.

10. A microscope system comprising
    the image processing apparatus according to claim 1, wherein
    the combined image generated by the image combining unit is displayed.

11. A non-transitory recording medium recording a program causing a computer to execute:
    a process of generating a plurality of normalized images by correcting, based on different imaging conditions, brightness of a plurality of images at different brightness obtained by imaging a same subject with the different imaging conditions; and
    when the normalized image corresponding to a reference image that is a brightest image among the plurality of images is defined as a reference normalized image, a process of generating a combined image by combining the plurality of normalized images, wherein the reference normalized image and a non-reference normalized image that is the normalized image other than the reference normalized image is combined to bring gradation of pixel of the combined image close to gradation of pixel of the reference normalized image if the gradation of pixel of the combined image is smaller than the gradation of pixel of the reference normalized image.

* * * * *